UNITED STATES PATENT OFFICE.

SWEN PULSON, OF WORCESTER, AND MARCUS L. SNOW, OF STERLING, MASSACHUSETTS.

COMPOSITION FOR EMERY AND CORUNDUM WHEELS AND OTHER TOOLS.

SPECIFICATION forming part of Letters Patent No. 275,704, dated April 10, 1883.

Application filed March 2, 1883. (No specimens.)

*To all whom it may concern:*

Be it known that we, SWEN PULSON and MARCUS L. SNOW, of Worcester and Sterling, respectively, in the county of Worcester and State of Massachusetts, have invented a new and useful Composition for Emery and Corundum Wheels and other Tools, of which the following is a specification.

Our composition is intended to be formed into articles of the desired form—as wheels, rolls, and other tools—and when dried and burned or baked to be ready for use. Its nature consists in the use of a low-melting flux or composition, with the emery or corundum or similar grinding or polishing substance. For this purpose we use a low-melting earthen or common clay with other substances in about the following proportions: To two pounds of emery or corundum of the desired grade, coarse or fine, add one-half a pound of earthen clay; one-half a pound of litharge; one-quarter of a pound of white lead; one ounce of soda; one-fourth ounce of yellow ocher; one-fourth ounce of manganese, and one ounce of sulphur in dry powdered form. Mix thoroughly, and add water to the consistency of soft mortar. From this the articles are molded to the desired form, and when dry are ready for the kiln.

In burning, we use a slow kiln, packing the article on suitable fire-brick saggers, covered or packed with common sand, raising the heat slowly to bright red in ten or twelve hours, and keeping about that heat for twelve or eighteen more, according to size of the articles and the degree of hardness desired, (the longer heat increasing the hardness) Then, after cooling slowly, they are ready for use.

By "earthen clay" we mean common brick or earthenware clay, from which all sand and coarse particles have been eliminated.

Having thus fully described our invention, what we claim therein as new, and desire to secure by Letters Patent, is—

The composition described for solid emery or corundum wheels and other tools, consisting of earthen clay, litharge, white lead, soda, yellow ocher, manganese, sulphur, and emery, corundum, or other grit, in about the proportions as above set forth.

SWEN PULSON.
MARCUS L. SNOW.

Witnesses:
KELO WANU,
J. G. ARNOLD.